(No Model.) 2 Sheets—Sheet 1.

J. AUSTIN.
BOILER FEEDER.

No. 362,480. Patented May 10, 1887.

Witnesses:
E. K. Campbell
Ned K. Campbell

Inventor,
Josiah Austin
C. D. Campbell
atty.

(No Model.)  
2 Sheets—Sheet 2.

J. AUSTIN.
BOILER FEEDER.

No. 362,480.  
Patented May 10, 1887.

Witnesses:  
E. K. Campbell  
Ned K. Campbell

Inventor:  
Josiah Austin,  
C. D. Campbell  
Atty.

United States Patent Office.

JOSIAH AUSTIN, OF EAST LIBERTY, OHIO.

BOILER-FEEDER.

SPECIFICATION forming part of Letters Patent No. 362,480, dated May 10, 1887.

Application filed November 11, 1886. Serial No. 218,631. (No model.)

*To all whom it may concern:*

Be it known that I, JOSIAH AUSTIN, a citizen of the United States, and a resident of East Liberty, in the county of Logan and State of Ohio, have invented a new and useful Boiler-Feeder, of which the following is a specification.

My invention is an improvement on my Patent No. 343,529, and relates to feeders for steam-boilers.

Figure 1:
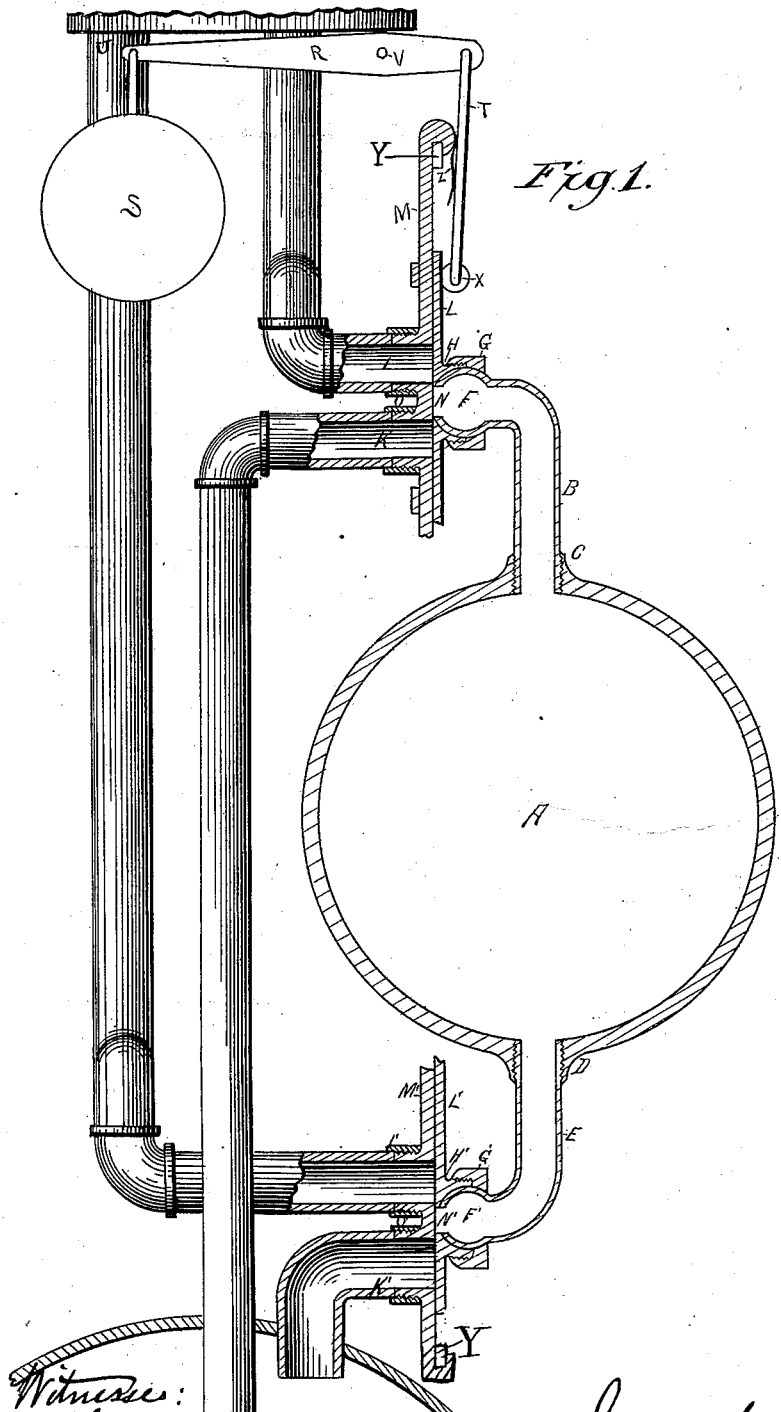
Figure 2:
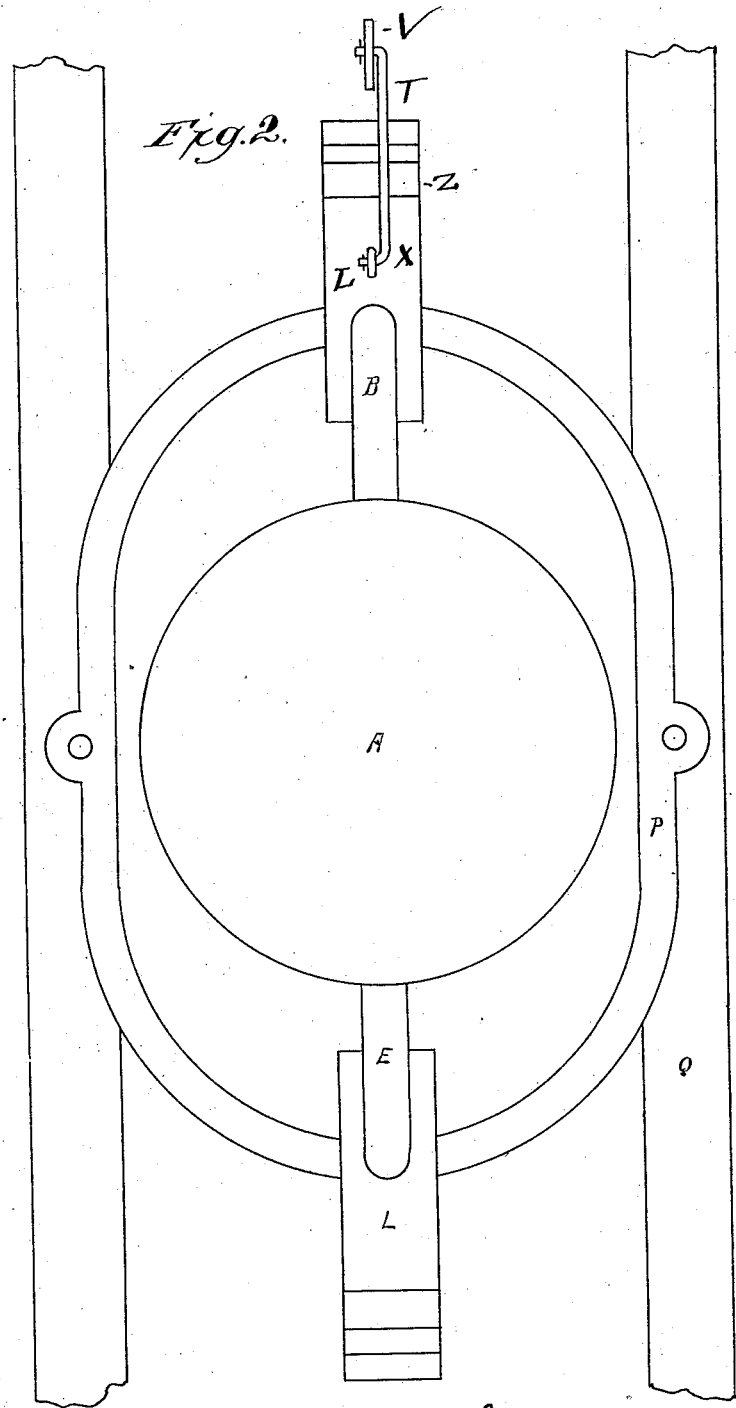

Figure 1 is a sectional view; Fig. 2, a front view.

A is a ball or chamber for receiving water from the tank and feeding it to the boiler. A' is the water-tank; B', a portion of the boiler; B, pipe connecting chamber with the steam-boiler and tank; E, pipe connecting chamber with water-tank and boiler; C D, connections of chamber with pipes B E; F F', ball-union making a flexible coupling in connection with nut G G' and bosses H H' on plate L; I I' K K', ports through plate M, which connect alternately with pipes B E and lead to the tank and boiler; L L', plates connected with pipes B and E by the ball-union F F', nuts G G', and threaded bosses H H'; M M', plates forming part of frame P, and having the ports I I' K K' therein for the inlet and exit of steam and water to and from the chamber A; N N', open ends of pipes B E; O O', part of plates M M' between ports I I' K K' which closes end of pipes B E when the feeder is not in operation. P is the frame mounted on posts Q; R, pivoted lever having weight S suspended from one end and connected by strap T to the plate L; U V W X, pivots; Y Y', rubber bumpers on ends of plates M M' to break the shock; Z, spring on end of plate M M', bearing against the face of plate M to hold the plate from sliding until the spring is overcome by proper amount of water in the chamber; *a b c d*, brackets or loops securing plates M together.

The construction and operation of my device are substantially as follows: The pipe or port I' is connected with a pipe leading to a water-tank located in any convenient position, while the pipe or port K' is connected with a pipe leading to the boiler. The pipe or port K also connects with a pipe leading from the boiler, conducting steam from thence to chamber A. Port I connects with a pipe running to the tank or other place desired to carry off the exhaust-steam from chamber A. These ports are made through bosses on plates M M', which form part of the continuous frame Q. Fitting closely to the face of plates M M' and sliding thereon are the two plates L L', having the threaded bosses H H' thereon, through which are the ports N N'. These bosses are connected to the pipes B and E, leading from the chamber A, by means of the ball-unions F F', which give a flexible connection. To the upper end of plate L is attached by strap T one end of pivoted beam R, having on its other end the weight S, sufficient to balance with the weight of chamber A when half full of water. On the upper and lower ends of plates M M' are rubber bumpers to lessen the shock of the plates L L' when ascending and descending. On plate M is also a spring, Z, which bears on plate L when in its highest position and while the chamber A is being filled with water, to prevent the plate descending until the proper amount of water has entered the chamber to insure a full stroke.

The operation is as follows: In the drawings, the chamber A is shown in center position, so as to bring ports N N' opposite the faces O O' of the plates M M', thus closing the entrance to the pipe. Supposing the ports I I' K K' connected to the pipes leading to the boiler and tank, as stated, and the chamber in position shown in the drawings, the chamber is pushed up until ports N and N' connect with ports I I' in plates M M'. Water from the tank will then pass through port I' and pipe E to the chamber A until a sufficient quantity has entered to overcome the weight S and spring Z, when the chamber will descend, connecting the port N' with pipe K', leading to the boiler, and port N with pipe K, also leading to the boiler. Steam is at once admitted from the boiler through ports K N into the chamber A, when, the pressure being equalized, the water in the chamber flows of its own gravity through pipe K into the boiler. As soon as the chamber empties, the weight S overbalances the weight of the chamber, raising the same until ports N N' connect with ports I I' again, when the exhaust-steam passes out at port I and the water is admitted again to the chamber through port I'. When the steam enters the chamber A through port K on top of the water, it rapidly condenses, forming a vacuum, which greatly facilitates the filling of the chamber when again connected with the water-tank.

Two balls or chambers can be used instead of one chamber and weight, plates carrying the balls being suspended from each end of a walking-beam and the parts duplicated.

What I claim is—

1. In a boiler-feeder, the combination, with stationary plates M M', having water and steam ports therein, of the sliding plates L L', having ports N N' therein, chamber A, and connecting-pipes B F, as and for the purpose set forth.

2. In a boiler-feeder, the combination, with the automatically filling and emptying chamber A, of the balancing-weight S and retaining-springs Z, as and for the purpose set forth.

3. The combination of chamber A and pipe B with plate L and ball-unions F G, as and for the purpose set forth.

4. The combination, with the balanced chamber A and sliding plates L, of the rubber Y and spring Z, as and for the purpose set forth.

5. The combination, with the frame Q, having the plates M M', with ports I I' K K' therein, of the balanced sliding plate L L', having ports N N', as and for the purpose set forth.

JOSIAH AUSTIN.

Witnesses:
 JOHN W. BOWMAN,
 PAUL G. BOWMAN.